Jan. 7, 1936.                    J. COULTER                      2,027,023
                         MULTIPLE SPINDLE BORING MACHINE
                            Filed Sept. 1, 1933            5 Sheets-Sheet 1

INVENTOR.
JAMES COULTER.
BY
Christian M. Newman
ATTORNEY

Jan. 7, 1936.  J. COULTER  2,027,023
MULTIPLE SPINDLE BORING MACHINE
Filed Sept. 1, 1933   5 Sheets-Sheet 3

INVENTOR.
JAMES COULTER.
BY Christian M. Newman
ATTORNEY

Jan. 7, 1936.　　　　　　　　J. COULTER　　　　　　　2,027,023
MULTIPLE SPINDLE BORING MACHINE
Filed Sept. 1, 1933　　　　　　5 Sheets-Sheet 4
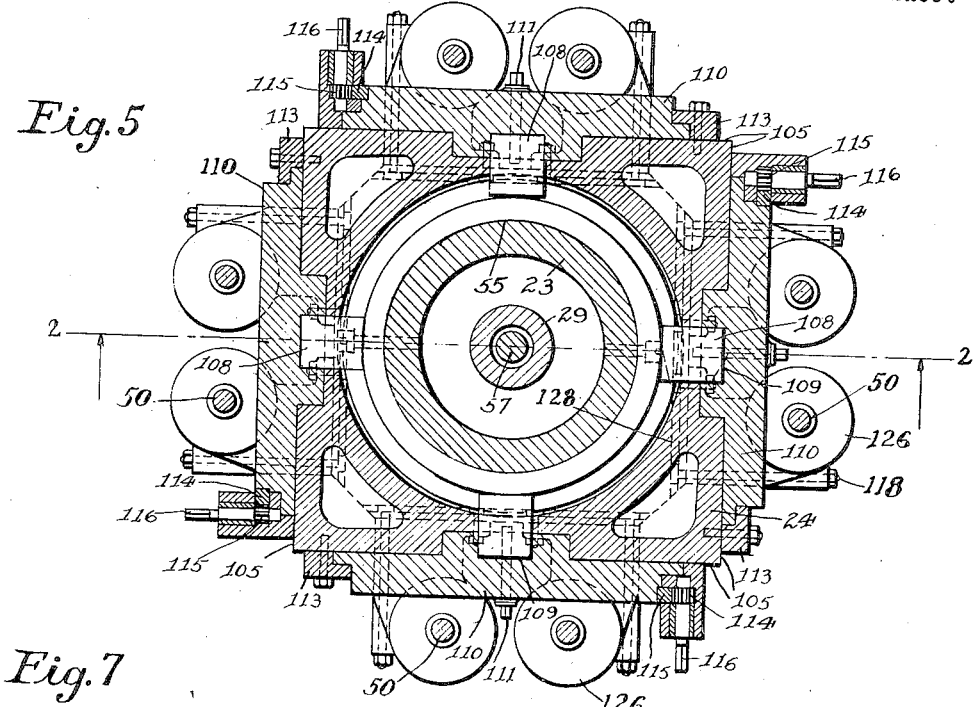
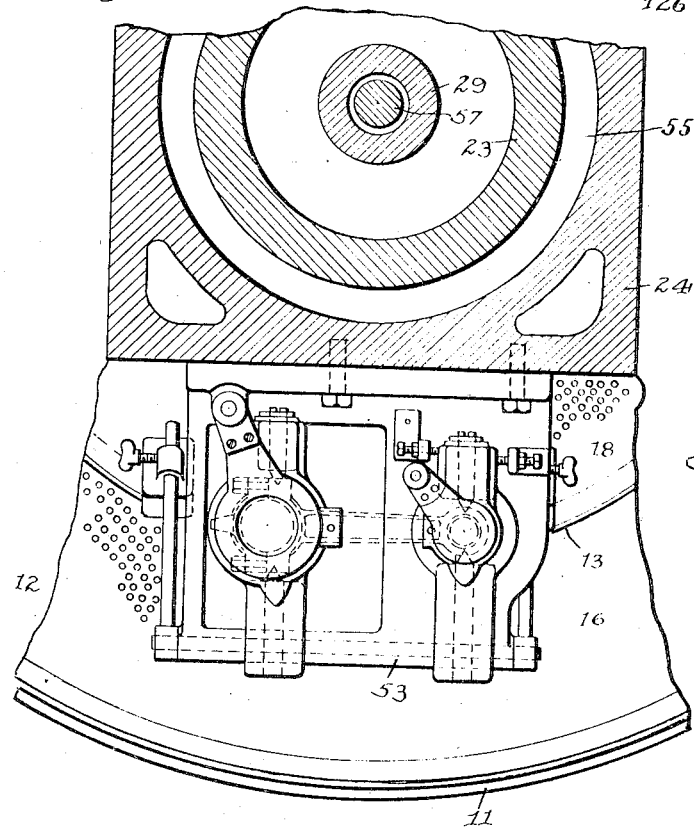
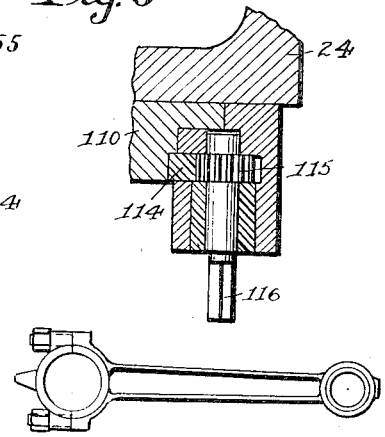
INVENTOR.
JAMES COULTER.
BY Christian M Newman
ATTORNEY Jan. 7, 1936.                    J. COULTER                    2,027,023
                     MULTIPLE SPINDLE BORING MACHINE
                       Filed Sept. 1, 1933           5 Sheets-Sheet 5

INVENTOR
JAMES COULTER.
Christian M. Newman
ATTORNEY

Patented Jan. 7, 1936

2,027,023

UNITED STATES PATENT OFFICE 2,027,023

MULTIPLE SPINDLE BORING MACHINE

James Coulter, Bridgeport, Conn.

Application September 1, 1933, Serial No. 687,781

6 Claims. (Cl. 77—4)

My present invention relates to a precision-boring machine of the multiple spindle type and comprises an improvement upon that class of machine shown and described in my prior Patent #1,673,398.

The invention relates more particularly to continuous boring or turning machines wherein the series of boring bars and work holders are mounted upon a continuously rotating carrier and whereby the operations are performed by suitable tools during the rotation of the carrier, and while the work is being carried away from and returned to the operator.

The machine is further designed so that the driving spindles become disengaged from their driving means when approaching and passing through the loading station and whereby the operator removes and replaces the work pieces without any stoppage of the rotary movement of the carrier.

A further feature of the invention is to mount the driving spindles in pairs or series upon the several faces of the carrier so that the tools may be used conjointly in the finishing of several spaced-apart holes in a single piece, or whereby said tools can be employed to operate on separate work pieces where but one hole in each is to be finished.

The machine is especially designed with a view of providing a boring machine having especially smooth running tool spindles, boring bars, and carrier, which comprise the more important elements so far as accuracy and uniformity of production is concerned.

The machine is automatic, requiring but one attendant, who stands in front of the machine and removes and replaces the work pieces, the boring bars being in continuous operation during the greater portion of the rotation of the carrier and are geared to complete their operations within a period of the rotation of the carrier, from and its return to the loading station.

Other objects and attended advantages will be appreciated by those familiar with this art as the invention becomes better understood by reference to the following description, when read in connection with the accompanying drawings, in which Fig. 1 shows a side elevation of my improved continuous turning multiple spindle diamond boring machine;

Fig. 5 shows a sectional plan view through the column, carrier, slides and tool spindles, taken on line 5—5 of Fig. 2;

Fig. 6 is an enlarged cross sectional view of the pinion and ratchet hand adjusting means for the several spindle slides shown in Fig. 5;

Fig. 7 is a fragmentary sectional plan view of the base, column, and drive shafts, taken on line 7 of Fig. 2, the same showing work holder for supporting the work piece shown in Fig. 8;

Fig. 8 shows a plan view of a piece of work, a connecting rod, the bores of which the machine is adapted to finish;

Figure 2:
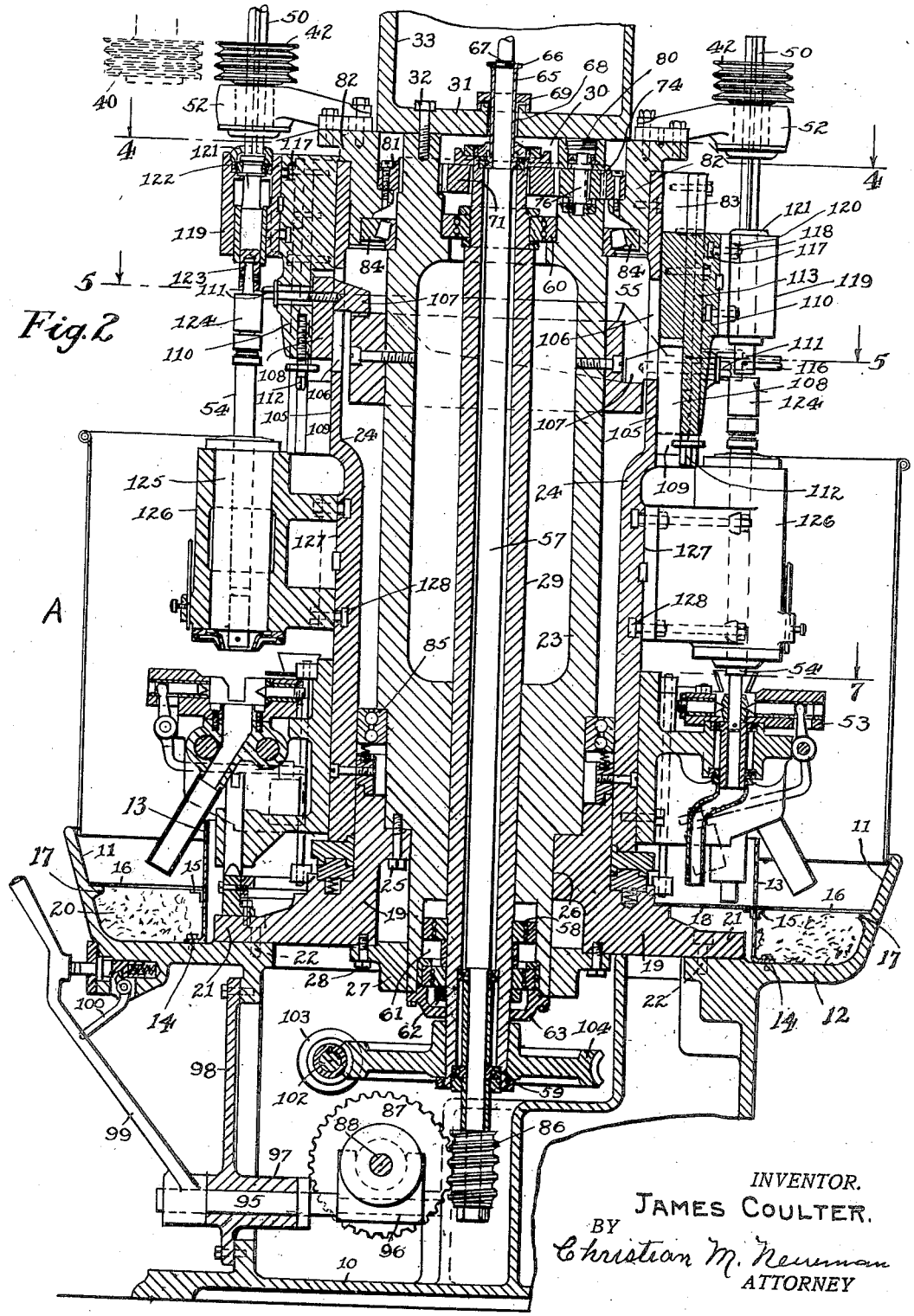
Fig. 2 is a central vertical longitudinal section on a slightly enlarged scale of the machine shown in Fig. 1, the motor bracket and part of the driving mechanism being broken away, said section being taken on line 2—2 of Fig. 5.
Figure 9:
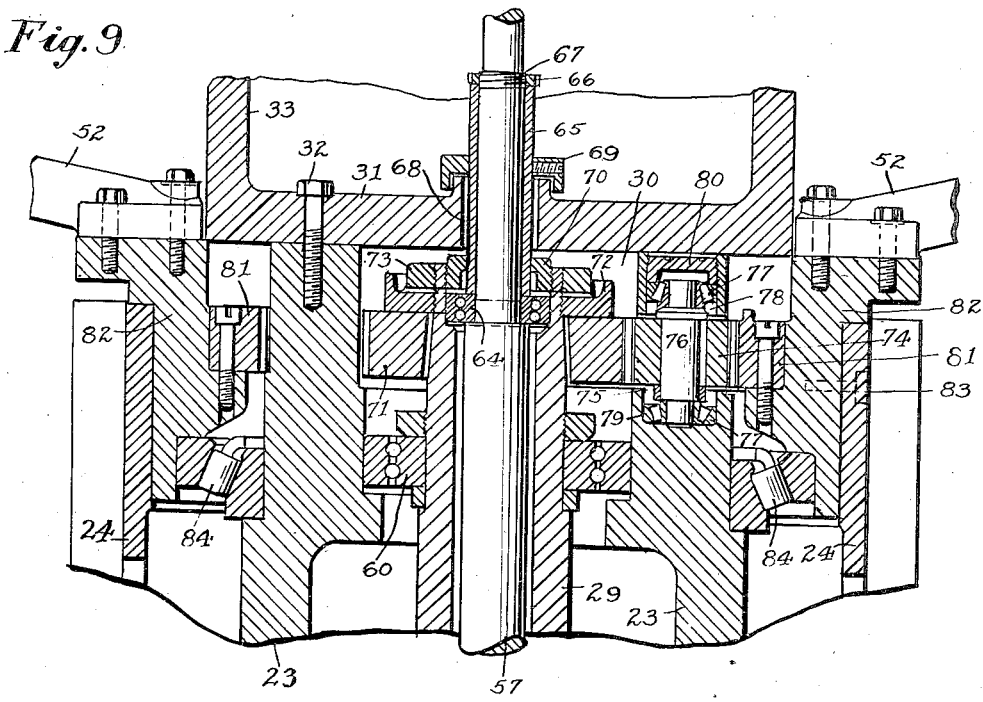
Figure 10:
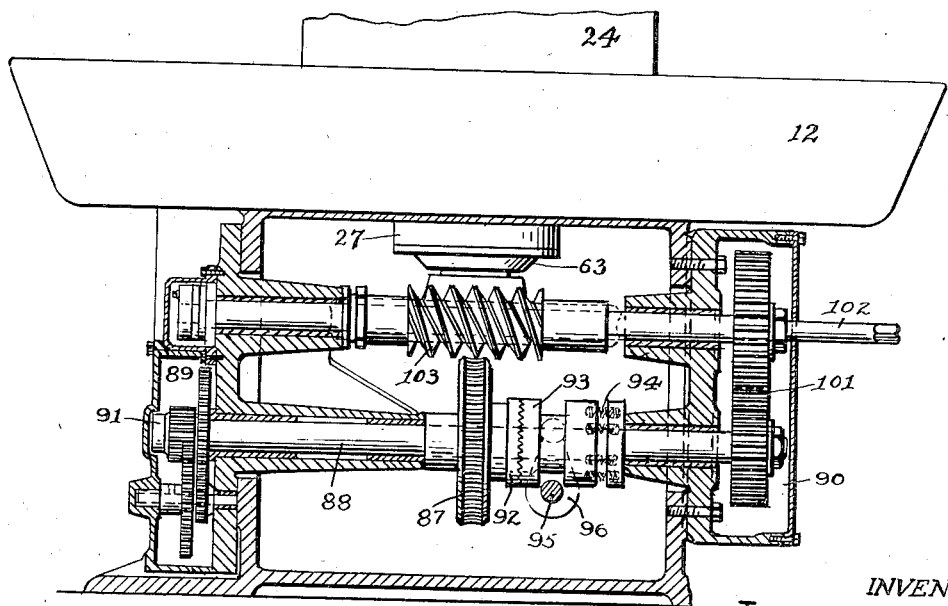

Fig. 9 is an enlarged vertical sectional view of the upper portion of the machine shown in Fig. 2, better to illustrate the bearings for the shafts, idler pinions, etc.; and Fig. 10 is a vertical cross section through the base of the machine, taken at a right angle to that shown in Fig. 2, better to illustrate the worm and gear drives, the clutch for starting and stopping the machine, and the change speed gearing.

Referring in detail to the characters of reference marked upon the drawings, 10 represents a stationary base which is more or less hollow inside to accommodate drive mechanism, later to be described. The upper portion of this base extends outwardly and upwardly, as at 11, forming an annular trough 12 to receive the chips and cutting lubricant. An annular vertically disposed division wall 13 is secured to the bottom of this trough by screws 14, thus dividing the trough into two annular compartments. Suitable angle brackets 15 are secured to the outer faces of this division wall to support a horizontally disposed screen partition 16, the outer edge of which rests upon an annular rib 17 formed on the inner face of the outer wall 11. A screen 18 is also positioned on the inside of the wall 13 and between it and the annular fixed bed 19 so as to strain the metal chips from the cutting compound as it is directed down upon the screen. A filling of cotton 20 or other porous material is preferably used beneath the screen through which the compound is strained to free it from both the bronze and Babbitt chips produced by the tools of the machine.

The bed member 19 of the frame includes an annular flange 21 that rests upon the top of the base 10 and is secured thereto by means of screw 22. This annular bed 19 serves in part to support the main cylindrical vertical stationary column 23 of the machine and around which the carrier 24 supporting the tools and work holders rotates. This column 23 is secured to the bed 19 by means of screws 25 and by reason of its lower cylindrical end portion being fitted in bearings 26 of the bed and a ring member 27, which is secured to the underside of the bed 19 by means of screws 28. The intermediate portion of the column includes a central longitudinal bore to accommodate a hollow driven shaft 29, and further includes an intermediate hollow portion, and a central recess 30 in its upper end portion to accommodate gearing, later to be described.

Figure 1:
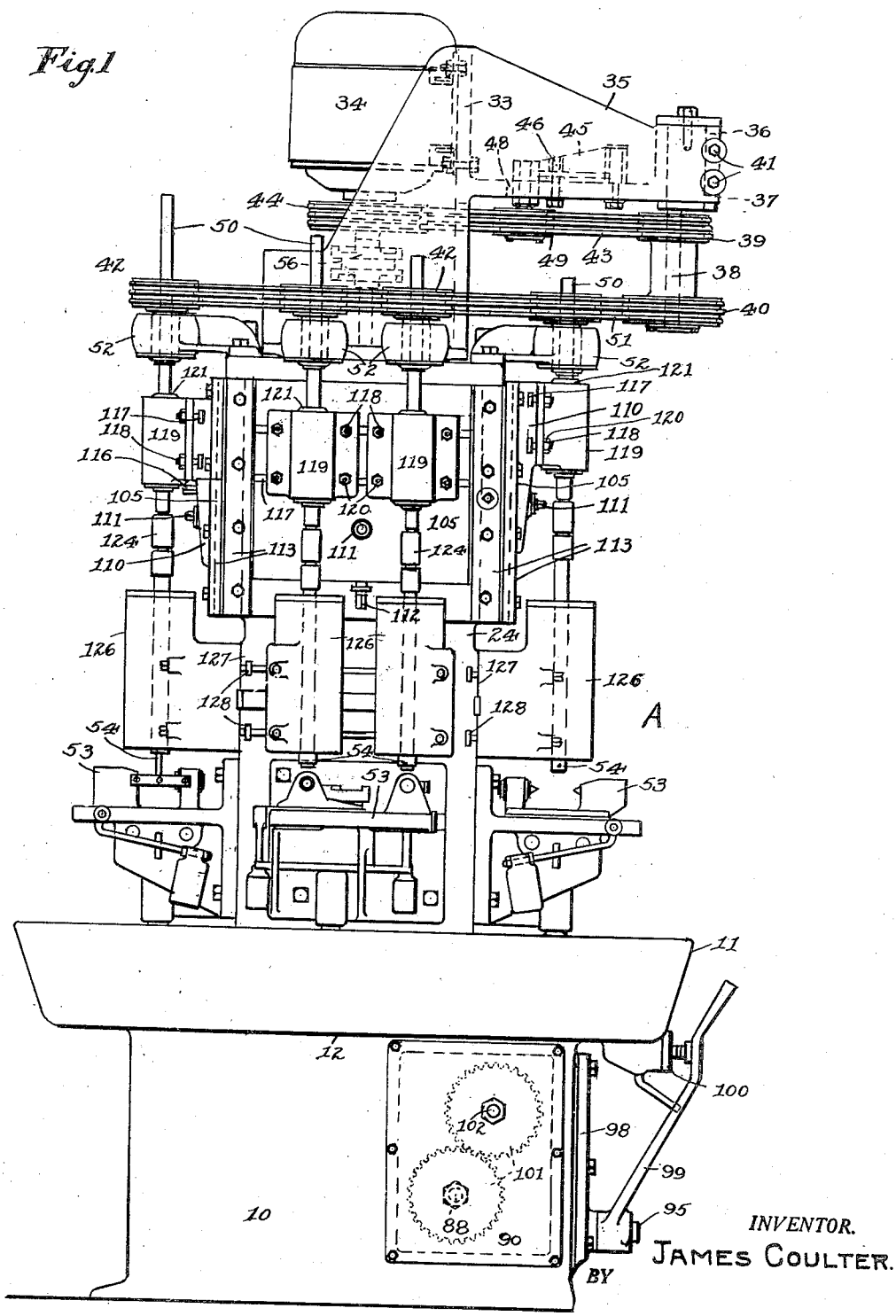
Figure 3:
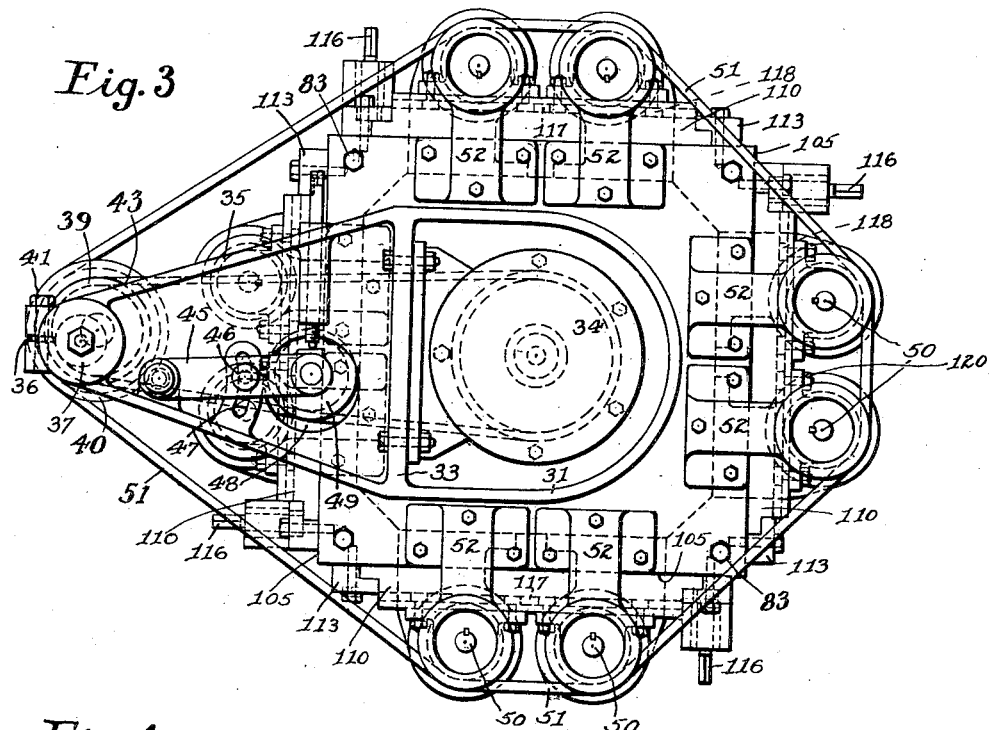
Fig. 3 is a top plan view, turned end for end, of the machine shown in Fig. 1, but drawn on the same scale as Fig. 2, and further illustrates the belt drive for the machine.
Figure 4:
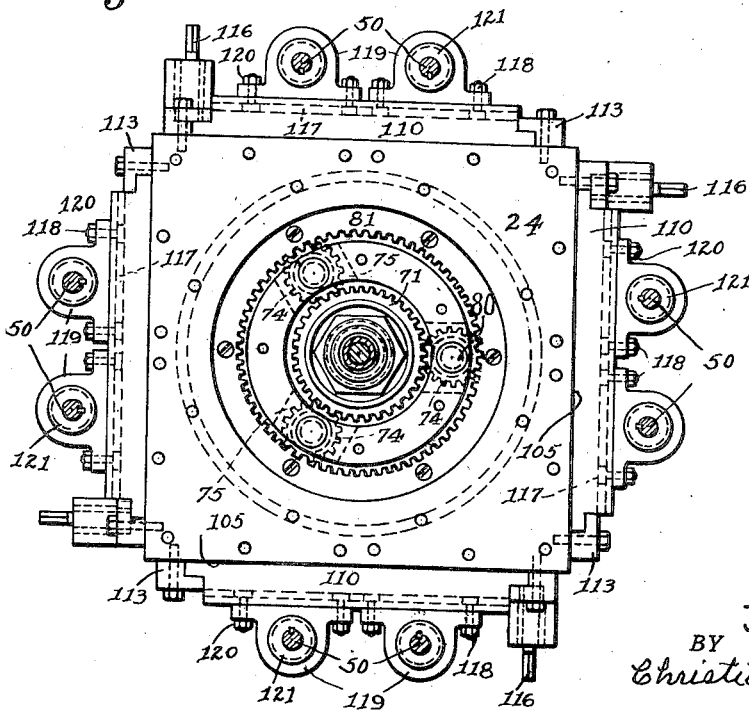
Fig. 4 is a top plan view on same enlarged scale, the motor, motor bracket, belting and driving pulleys being omitted, see line 4—4 of Fig. 2.

A motor bracket 31 is secured to the upper end portion of this fixed column by means of screws 32, see Figs. 1, 2 and 3. This bracket includes a vertically disposed portion 33, to which an electric motor 34 is secured and by means of which the machine is driven, and whose axis of rotation is in vertical alignment with that of the center of the machine and the axis of the before mentioned hollow shaft. This bracket further includes an arm 35 having a slotted end leading into a hole 36 in its outer end portion and forming a clamp to receive a shank 37 of a spindle 38 which is eccentric to the shank and which supports pulleys 39 and 40.

This shank is therefore rotatably adjustable within the hole and is secured in such adjusted positions by means of clamping screws 41. This adjustment is for the purpose of adjusting the pulleys 39 and 40 with respect to the spindle pulleys 42 with which they are belted. The pulley 39 is connected by means of belts 43 with a driving pulley 44 on the motor shaft.

An adjustable arm 45 is hingedly connected to the base of the arm 35 of the bracket 31 and is adapted to be secured in adjusted positions by means of a set screw 46 carried thereby and extending through a slot 47 in said base, and provided with a nut on one end. The inner free end of this arm 45 includes a depending bearing that extends through an opening 48 in the said base of the arm 31 and carries a depending fixed spindle upon which an idler pulley 49 is rotatably mounted. By this means the V-belts 43 may be tightened irrespective of the eccentric adjusting means for the pulleys 39 and 40.

As will be understood, the eight driving spindle 50 for the boring bars are driven from the motor through the V-belts 43, double pulleys 39 and 40, and V-belts 51 that connect the pulley 40 with spindle pulleys 42 each of which are journaled in separate brackets 52 secured to the top of the carrier, see Figs. 1 and 3. These spindles and their work holders 53, which are mounted upon the carrier, are alike in construction; therefore like reference characters will be employed to designate the duplicate parts of the several units. The vertically disposed spindles of these units serve to drive the boring bars, carried by the slides later to be referred to, both of which are in vertical alignment with the axis of the several spindle driving pulleys 42 while the work holders 53 are fixed with relation to the carrier, thus constituting a machine wherein the tools rotate and the work is held stationary on a movable carrier.

In addition to the rotary movements imparted to the boring bars, means is also employed for feeding them vertically into and out of the work, which in part comprises a fixed cam 54 secured to the before mentioned column 23, as by means of screws, as shown, the high point on the cam being such as to withdraw the pairs of bars from the finished work pieces as the work approaches the loading station designated as A in Figs. 1 and 3, and which as will be observed, is beneath the arm 35 and double pulleys 39 and 40. In this respect it will be seen that as the belt pulleys 42 and their spindles approach and pass the loading station, they move out of engagement with the spindle driving belt 51 so that the spindles will not be rotating during the time when the finished work piece is being removed and a new piece replaced in the work holders.

A coupling 56 serves to connect the motor shaft with a centrally-positioned longitudinal solid shaft 57 that extends down through the before mentioned hollow shaft 29 and is provided with roller ball bearings 58 between it and the lower portion of said hollow shaft. Ball bearings 59 are provided between the lower end portion of the hollow shaft 29 and the column 23, and a similar bearing 60 is provided in the before mentioned recess 30 between the upper end of the hollow shaft and the column so as to operatably mount the shaft central and longitudinal of the machine. The bearings 59 are contained within a recess 61 in the lower end portion of the column and are supported with reference to the shaft 29 by a nut 62 that is adjustably mounted upon a peripheral threaded portion of said shaft, see Fig. 2, and said recess, nut and bearings are enclosed by means of a cap 63 that is secured to the lower end of the column by means of screws, as shown.

Referring to Figs. 2 and 9, it will be seen that the upper end of the solid shaft 57 is reduced and shouldered to carry the inner member of a ball bearing 64. This bearing member is secured on the reduced end portion of the shaft by a sleeve 65, that in turn is engaged by a nut 66 whose thread engages the threads 67 of the solid shaft for the purpose of clamping the bearing member to the solid shaft. This sleeve extends through an opening 68 of the motor bracket, and the said opening is covered by a cap 69 secured to the sleeve. The bore of the tubular shaft is enlarged in its upper end and is provided with both an internal and external thread, the internal thread serving to receive a closure plug 70 that surrounds the sleeve and is positioned above the ball bearing 64 that encloses the same.

The central gear 71 is keyed to the tapered end of the hollow shaft and clamped thereon by means of an annular nut 72 that engages the lower portion of the external threaded end of the hollow shaft, to force the said gear down upon the upper tapered end of the hollow shaft. A lock nut 73 is also mounted upon the upper threaded end of this hollow shaft and serves to engage the top side of the before mentioned nut 72 so as to further secure the gear in place. This central gear meshes with and drives three small idler pinions 74 that are each positioned in a radial pocket 75 formed in the upper end portion of the column and each are secured to a short spindle 76 whose upper and lower ends are carried in ball bearings 77 positioned in holes 78 and 79 in the upper annular end portion of the column, and are enclosed by threaded plugs 80 positioned in said holes. These idler pinions in turn mesh with a ring gear 81 that is secured to the upper end portion of a top member 82 secured to the carrier by means of screws 83, there being a roller bearing 84 provided between said annular top member of the carrier and the upper shouldered portion of the column, and a ball bearing 85 between the lower portion of said member, to provide an accurate rotary movement of the carrier with respect to the column. These gears are further enclosed by the motor bracket 31, that is secured to the top end of the column, as before described.

A worm 86 is mounted upon the lower end of the solid shaft 57 that meshes with and drives a worm gear 87 loosely mounted on a cross shaft 88 journaled in bearings of an oil pump housing 89 secured to one side of the base, and a change gear housing 90 attached to the opposite side of the base. Suitable gear connections 91 are enclosed in this housing 90 and made with the shaft 88 for the purpose of operating an oil pump for lubricating the machine, but which forms no part of my present invention.

The worm gear 87 which runs loose on the shaft 88 carries a clutch member 92 that is engaged and operated by a movable clutch member 93 slidably keyed on the before mentioned shaft 88, and whereby the driving connection from the motor to the spindles and their slides is effected. This slidable clutch, as will be seen from Figs. 2 and 10, is operated through a rocker shaft 95, against the action of springs 94, bearing an arm 96 to disengage the movable member 93 of the clutch, said springs serving to normally hold the clutch closed. The bearing 97 for the rocker shaft 95 is formed in a removable plate 98 attached to the front side of the machine. An operating handle 99 is secured to this shaft 95 and provided with means 100, see Fig. 2, for holding the operating handle, its shaft and clutch, in their adjusted positions with respect to the base. The shaft 88 is connected through change gears 101 enclosed within a gear housing 90 and serves to drive a parallel shaft 102 that is journaled in bearing of the said gear housing and pump housing. This shaft 102 carries a worm 103 that meshes with and drives a relatively large worm gear 104 secured to the lower end of the hollow shaft 29.

The carrier 24 is square outside and round or cylindrical inside, having a slightly larger upper outside diameter than lower diameter, forming four upper sides or faces 105, which are alike. Each of these sides is provided with an elongated opening 106, see Fig. 2, to receive and accommodate a vertically movable shoe 107 whose elongated vertically disposed portion 108 is fitted to slide in a recessed guide-way 109 of the carrier. These shoes serve to support and carry the four spindle-slides 110, one of which is vertically movably mounted upon each of the four faces of the carrier, and are adjustably secured to the slides by means of screws 111 and 112, the last mentioned screw having a flange to engage a slot in the shoe for the vertical adjustment of the slide with respect to the shoe, whereas the first mentioned screw 11 passes through a slot in the slide and threadably engages the sleeve to secure the slide to the shoe after being adjusted. These slides are further supported and guided by parallel vertical gibs 113 attached to the outer face 105 of the carrier, and cover the edges of the slides, see Fig. 6. In this connection, I have also illustrated hand adjusting means for each spindle slide, including a rack 114 in one of its side edge portions that is engaged by pinion 115 mounted on a headed shaft 116 journaled in bearings of the gib 113. By applying a wrench to the headed end of the shaft, the slide may be manually raised and lowered when it is desired to adjust the same, and rocks idly with the vertical movements of the spindle slide when the same is operated by power.

These spindle slides are provided in their face with a pair of transverse T-slots 117 to receive T-bolts 118 that pass through holes in the vertical flanges of the spindle heads 119, and are provided with nuts 120 whereby the spindle heads are secured to the spindle slides, as shown, there being four such T-bolts and nuts for each of the two spindle heads supported on each of the spindle slides. Each of these spindle heads contains a bushing 121 and a ball bearing 122 in which the spindle is rotatably mounted.

The lower end of the driving spindle 50 is provided with a central longitudinally tapered socket 123 to receive the tapered shank of the universal coupling 124 to which the boring bars 54 are connected. The boring bars are mounted in a bushing 125 of the guide bearing 126 and in alignment with the spindle 50, the said guide bearing being laterally adjustable on the lower face 127 of the carrier, which like the upper face is provided with T-slots 128 by means of which the guide bearing is adjustably secured to the carrier.

From the foregoing it will be seen that the rotary movement of the carrier as well as the vertical movements of the spindles are imparted from the motor through the central shaft 57, its gear connections with the cross shaft 88, the change gears 90, to the worm gear upon the hollow shaft 29, and from that through the train of gears at the top with the ring gear 81, secured to the carrier, and that the starting and stopping of both the rotary movements of the carrier and the vertical movements of the spindles are controlled through the operating handle 99. This lever and clutch means serve to control the rotary movement of the carriage and vertical feeding and return movements of the spindles, but does not effect the rotary movement of the spindles, which, as will be seen from the line of belting, Figs. 1 and 3, are connected to be driven continuously with the drive of the motor.

The design of the work holders, heretofore designated as 53, may vary according to the particular piece of work to be held and operated upon. It may be in the form of a single holder mounted upon each of the four faces of the carrier, as shown herein, and adapted to receive and hold a single piece of work while being operated upon by the two separate boring bars. If preferred, two holders may be employed on each side of the carrier, one for each boring bar, depending again upon the class of work to be held, in which case the holders can be independently operatable.

In the present set-up of my machine, a special design of work holder is provided for boring or turning two spaced-apart parallel holes in a single piece, as for instance a connecting rod for a motor, as shown positioned by dotted lines in Fig. 7 and in full lines in Fig. 8. In the placing of these connecting rods in the machine, the one work holder is designed to receive and clamp both end portions of the rod, and in line with one of the boring bars of the two spindles, one bar obviously being larger than the other to accommodate the difference in size of holes in the work piece. In this connection, I have also provided automatic means for opening and closing the jaws of the holders so that all the operator has to do is simply to take out the finished piece and put in the new piece to be operated upon.

Having thus described my invention, what I claim and desire to secure by Letters Patent is:

1. In a multiple spindle machine, the combination of a column, a carrier rotatably mounted thereon, a vertical longitudinal hollow shaft journaled centrally in the column, a driving shaft within the hollow shaft, a motor on the upper end of the column connected to drive the driving shaft, intermediate pulleys, a belt connecting the central drive shaft and intermediate pulleys, vertically reciprocatory slides mounted on the carrier, driving spindles journaled in the slides each carrying a belt pulley, a belt connecting the driving spindle pulleys with one of the intermediate pulleys, change speed gearing in the lower end of the column intermediate the driving shaft and hollow shaft for operating the latter, and gearing in the upper end of the column intermediate the hollow shaft and carrier for rotating the same.

2. In a multiple spindle boring machine, the combination of a column, a fixed cam mounted thereon, a carrier and means for rotating the same upon the column, a series of vertically movable slides mounted on the outer faces of the carrier, a bearing head mounted on each slide, shoes carried by the slides to engage the fixed cam whereby the slides are raised and lowered with the movement of the carrier, brackets projected from the carrier above the slides, driving spindles journaled in the heads and extending through the brackets and adapted to be moved vertically with the slides, a driving pulley mounted on and in sliding relation to each of the spindles, means for driving said driving pulleys and spindles, separate bearings fixed on the carrier below the slides, boring bars carried in said bearings in alignment with the driving spindles and connected to be moved longitudinally therewith, means for rotating the carrier, and means for permitting one or more of the pulleys and spindles to become idle with each rotation of the carrier.

3. A multiple spindle boring machine comprising a column, a carrier rotatably mounted on the column, a series of vertically movable slides mounted on the carrier, a bearing head mounted on each slide, driving spindles carried by the slides, means for raising and lowering the slides and spindles, a separately mounted bearing on the carrier below each slide, a boring bar journaled in each of said bearings in alignment with and flexibly connected thereto, a non-rotatable tool holder secured to the carrier beneath each boring bar, a vertically disposed driving shaft within the column, driving means connected with the upper end of said shaft, a vertically disposed driven shaft, gearing in the base of the column intermediate the driving shaft and driven shaft for operating the latter, gearing intermediate the driven shaft and carrier for rotating the same, separate driving connections intermediate the driving means and the several driving spindles whereby the latter may be driven independent of the rotary movement of the carrier and means whereby each of said driving spindles are disengaged and engaged from said driving means during each rotation of the carrier.

4. A multiple spindle machine comprising a base, a cylindrical column, a vertical longitudinally disposed hollow shaft journaled in the column, a driving shaft within the hollow shaft, change speed means connecting the two shafts comprising two transverse shafts within the base, a worm and gear connection from the lower end of the driving shaft to the first one of the transverse shafts, a clutch intermediate the worm gear and said first mentioned transverse shaft, change gears also within the base connecting the two transverse shafts, worm and gear driving connections between the second transverse shaft and the hollow shaft, a carrier rotatably mounted on the column, gearing intermediate the top end of the hollow shaft and carrier for rotating the same, vertically reciprocatory slides mounted on the carrier, driving spindles carried by the slides, means for rotating the carrier, a cam secured to the stationary column, and means carried by the slides to engage the cam for supporting and reciprocating the slides by the rotation of the carrier.

5. The combination of a column, a carrier rotatably mounted on the column, a series of non-rotatable work holders and slides mounted on the carrier, spindles slidably mounted in the slides adapted to travel in an orbit with respect to the axis of the carrier, separately mounted bearings on the carrier below each slide, a boring bar journaled in each bearing and flexibly connected with the spindles, a motor centrally mounted on the column, direct driving connections from the motor to rotate the carrier, a driving pulley carried by the motor, intermediate pulleys, one of which is connected by belt with the motor pulley outside of the path of travel of the spindles, a belt connecting one of the intermediate pulleys with the driving pulleys on the spindles for rotating the carrier and moving the spindles and their pulleys within the loop of the last mentioned driving belt and so that each of the spindle pulleys will run out of engagement with said driving belt for a limited period during each rotation of the carrier, to permit removal and replacement of work pieces in the work holders.

6. In a multiple spindle boring machine, a combination of a fixed column, a fixed cam mounted thereon, a carrier, a rotatable hollow shaft journaled in the column, a central drive shaft journaled in the hollow shaft, gearing in the base of the machine intermediate the central and hollow shaft for driving the latter, driving connections from the upper end of the hollow shaft to the carrier for rotating the same, a series of vertically movable slides mounted on the outer faces of the carrier, shoes adjustably secured to the slides to engage the fixed cam whereby the slides are raised and lowered with the movement of the carrier, brackets projected from the carrier, driving spindles journaled in the slides and brackets, adapted to be moved vertically with the slides and in the brackets, separately mounted bearings upon the carrier below the slides, boring bars journaled in said bearings in alignment with and flexibly connected to the driving spindles and adapted to be moved vertically therewith, and belt means for rotating the driving spindles.

JAMES COULTER.